US010536661B2

(12) United States Patent
Kankaanpää et al.

(10) Patent No.: US 10,536,661 B2
(45) Date of Patent: *Jan. 14, 2020

(54) TRACKING OBJECT OF INTEREST IN AN OMNIDIRECTIONAL VIDEO

(71) Applicant: Microsoft Technology Licensing, LLC, Redmond, WA (US)

(72) Inventors: Esa Kankaanpää, Hyvinkaa (FI); Shahil Soni, Espoo (FI); Klaus Melakari, Oulu (FI); Niko Eiden, Espoo (FI); Roope Rainisto, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,662

(22) Filed: Apr. 3, 2019

(65) Prior Publication Data
US 2019/0230307 A1 Jul. 25, 2019

Related U.S. Application Data

(63) Continuation of application No. 14/926,854, filed on Oct. 29, 2015, now Pat. No. 10,277,858.

(51) Int. Cl.
*H04N 5/44* (2011.01)
*G06K 9/00* (2006.01)
(Continued)

(52) U.S. Cl.
CPC ....... *H04N 5/4403* (2013.01); *G06K 9/00711* (2013.01); *G06K 9/00771* (2013.01);
(Continued)

(58) Field of Classification Search
CPC ............. H04N 5/4403; H04N 5/23238; H04N 2005/4417; H04N 2005/443; G06K 9/00711; G06K 9/3233; G06K 9/00771
See application file for complete search history.

(56) References Cited

U.S. PATENT DOCUMENTS 6,611,282 B1 8/2003 Trubko et al.
8,964,054 B2 2/2015 Jung et al.
(Continued)

FOREIGN PATENT DOCUMENTS

CN 103268610 A 8/2013
CN 104012106 A 8/2014

OTHER PUBLICATIONS

"Final Office Action Issued in U.S. Appl. No. 14/938,606", dated Apr. 5, 2019, 16 Pages.
(Continued)

*Primary Examiner* — Howard D Brown, Jr.

(57) ABSTRACT

A device is presented. The device comprises: at least one processor and at least one memory including computer program code, a display element coupled to the processor, and a user input element coupled to the processor. The computer program code and the at least one memory are configured, with the at least one processor, to cause the device to: play an omnidirectional video comprising a series of image frames, display a portion of the image frames of the played omnidirectional video on the display element, receive a user input from the user input element, the user input comprising selection of an object of interest in the displayed portion of at least one image frame of the played omnidirectional video, identify the object of interest in at least one image frame of the played omnidirectional video based on the user input, track the selected object of interest in consequent image frames of the played omnidirectional video, and adjust the displayed portion of the consequent image frames of the played omnidirectional video so that the tracked object of interest remains in the displayed portion. A method and method are also presented.

20 Claims, 5 Drawing Sheets

(51) Int. Cl.
*G06K 9/32* (2006.01)
*H04N 5/232* (2006.01)

(52) U.S. Cl.
CPC ....... *G06K 9/3233* (2013.01); *H04N 5/23238* (2013.01); *H04N 2005/443* (2013.01); *H04N 2005/4417* (2013.01)

(56) References Cited

U.S. PATENT DOCUMENTS

| | | | |
|---|---|---|---|
| 9,041,826 B2 | 5/2015 | Jung et al. | |
| 9,224,060 B1* | 12/2015 | Ramaswamy | G06K 9/00912 |
| 9,621,749 B2 | 4/2017 | Jung et al. | |
| 9,741,236 B2 | 8/2017 | Hess et al. | |
| 2007/0040928 A1 | 2/2007 | Jung et al. | |
| 2007/0052856 A1 | 3/2007 | Jung et al. | |
| 2007/0109411 A1 | 5/2007 | Jung et al. | |
| 2007/0274563 A1 | 11/2007 | Jung et al. | |
| 2008/0043108 A1 | 2/2008 | Jung et al. | |
| 2012/0286951 A1 | 11/2012 | Hess et al. | |
| 2016/0063710 A1* | 3/2016 | Tanaka | G05D 1/0246 382/103 |
| 2017/0197656 A1* | 7/2017 | Oh | B60R 1/00 |
| 2018/0247505 A1* | 8/2018 | Arai | G08B 13/19602 |

OTHER PUBLICATIONS

"Office Action Issued in European Patent Application No. 16785027.0", dated Mar. 26, 2019, 9 Pages.
"Notice of Allowance Issued in U.S Appl. No. 15/856,047", dated Aug. 28, 2019, 12 Pages.
"Final Office Action Issued in U.S. Appl. No. 14/938,606", dated Sep. 6, 2019, 15 Pages.
"First Office Action and Search Report Issued in Chinese Patent Application No. 201680060294.4", dated Oct. 8, 2019, 13 Pages.
"First Office Action and Search Report Issued in Chinese Patent Application No. 201680066226.9", dated Sep. 30, 2019, 18 Pages.

* cited by examiner

TRACKING OBJECT OF INTEREST IN AN OMNIDIRECTIONAL VIDEO

RELATED APPLICATION

This application is a continuation application of U.S. patent application Ser. No. 14/926,854, filed Oct. 29, 2015, which is incorporated by reference.

BACKGROUND

Omnidirectional cameras which cover a 360-degree image in the horizontal pane, or both in horizontal and vertical panes, have been used in panoramic imaging and video recording. The images and videos recorded by such cameras can be played back by consumer electronic devices, and normally the device user is given control over which segment of the 360 frame is displayed. This can be done for example by manually choosing the viewpoint during playback.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A device, method and system are presented. The device and method comprise features which provide users with a possibility to select and track a selected object of interest in an omnidirectional video. In embodiments, this selection and tracking may be performed in real time during the video capture, recorded as metadata and saved into a memory together with the video, and in some embodiments the selection and tracking are carried out on prerecorded videos.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numbers correspond to like elements on the drawings.

DETAILED DESCRIPTION

The detailed description provided below in connection with the appended drawings is intended as a description of the embodiments and is not intended to represent the only forms in which the embodiments may be constructed or utilized. The description sets forth the structural basis, functions and the sequence of operation steps. However, the same or equivalent functions and sequences may be accomplished by different embodiments not listed below.

Although some of the present embodiments may be described and illustrated herein as being implemented in a personal computer or a portable device, these are only examples of a device and not a limitation. As those skilled in the art will appreciate, the present embodiments are suitable for application in a variety of different types of devices incorporating a processor, memory and display.

Figure 1A:
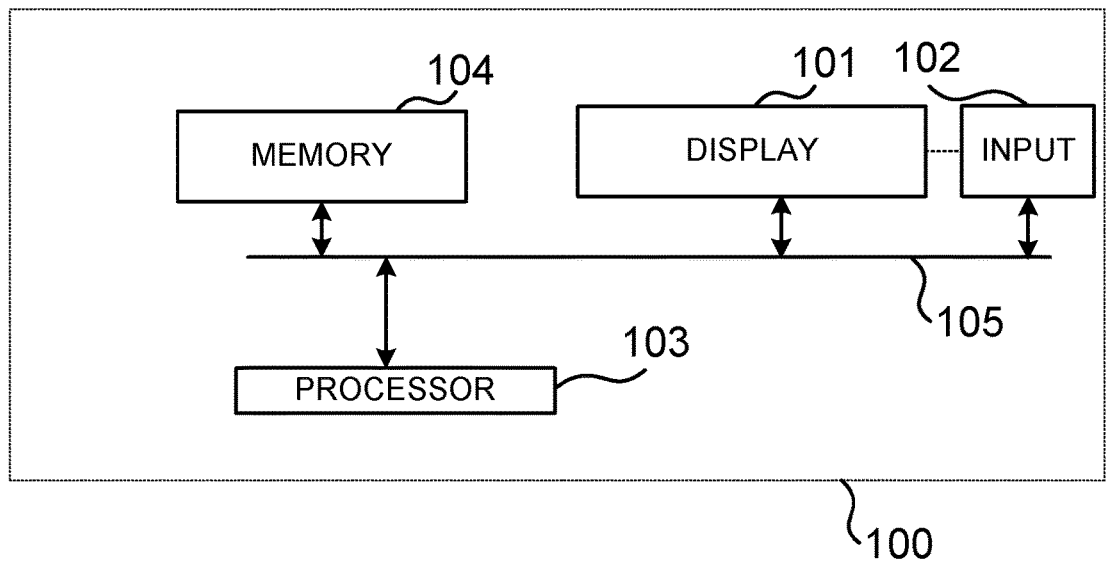
FIG. 1a is a schematic illustration of the main components of a device according to an embodiment.

FIG. 1 shows a block diagram of an embodiment of device 100. The device 100 may be any device adapted to play back omnidirectional videos. For instance, the device 100 may be a device for editing omnidirectional videos, a personal computer, or a handheld electronic device. The device 100 comprises at least one processor 103 and at least one memory 104 including computer program code, a display element 101 coupled to the processor 103, and a user input element 102 coupled to the processor 103. The memory 104 is capable of storing machine executable instructions. The memory 104 may store other instructions and data. Further, the processor 103 is capable of executing the stored machine executable instructions. The processor 103 may be embodied in a number of different ways. In an embodiment, the processor 103 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one embodiment, the processor 103 utilizes computer program code to cause the device 100 to perform one or more actions.

The memory 104 may be embodied as one or more volatile memory devices, one or more non-volatile memory devices or a combination thereof. For example, the memory 104 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-ROM (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.). In an embodiment, the memory 104 may be implemented as a remote element, for example as cloud storage.

The computer program code and the at least one memory 104 are configured, with the at least one processor 103, to cause the device to perform a sequence of actions listed below.

An omnidirectional video comprising a series of image frames is played by the device 100, this may be done by using computer program code by the processor 103. In an alternative embodiment, the device 100 further comprises a playback element coupled to the processor 103 adapted to play back the video.

A portion of the image frames of the played omnidirectional video is displayed on the display element 101. A portion of the image frames refers to a viewpoint inside a wide-angle omnidirectional video, wherein a user may watch the omnidirectional video through this viewpoint displayed on the display element 101. Examples of the display element 110 may include, but are not limited to, a light emitting diode display screen, a thin-film transistor (TFT) display screen, a liquid crystal display screen, an active-matrix organic light-emitting diode (AMOLED) display screen and the like. Parameters of the portion of the image frames which are displayed can depend on the screen type, resolution and playback device 100 that is being used.

The user input element 102 provides a user input to the processor 103. The user input comprises at least a selection of an object of interest in the displayed portion of at least one image frame of the played omnidirectional video. The object of interest may be a person, a moving object, an inanimate object of a certain shape or color, or any other identifiable object. The user input element 102 may comprise for example a touch screen, a mouse and keyboard, a controller, a gesture identification element, a voice command element, or a gaze detection element configured to detect a gaze of a user of the device 100 who is watching the video and focuses on a particular object of interest. Selection of the object of interest may include, but is not limited to, clicking, pointing at, tapping, double tapping, circling, enclosing, gazing or otherwise indicating the object of interest to the processor 103.

The selected object of interest is then identified in at least one image frame of the played omnidirectional video based on the user input. In an embodiment, the object of interest is identified in a number of subsequent image frames which constitute a segment of the played video sufficient to commence tracking. The processor 103 is then configured to track the selected object of interest in consequent image frames of the played omnidirectional video. The device may also comprise a segmentation element controlled by the processor 103, wherein the segmentation element is configured to perform segmentation of the image frames of the omnidirectional video to identify and track the selected object of interest in the video. In an embodiment, the memory 104 stores one or more predefined objects or object types, and the processor 103 is configured to perform object identification based on a comparison between the selected object of interest and the stored objects or object types. The object types may include, but are not limited to people, vehicles, animals etc. Objects may include, but are not limited to, facial features of a person, particular model of a vehicle etc. This can be used if only a certain object type needs to be tracked by the device 100, and helps isolate the unwanted identifications.

The processor 103 is further configured to adjust the displayed portion of the consequent image frames of the played omnidirectional video so that the tracked object of interest remains in the displayed portion. The processor 103 can be configured to lock the displayed portion such that the selected object of interest remains in the center, or adjust the displayed portion when the object is near one of the edges of the displayed portion.

In an embodiment, the computer program code and the at least one memory 104 are configured, with the at least one processor 103, to cause the device to detect that the tracked object of interest is absent from a predefined number of image frames, and stop tracking the selected object of interest. For example, if the selected object of interest is a person, this person may move behind an obstacle or, if the camera is configured to capture approximately 180 degrees in a vertical or horizontal dimension, the object can move outside of the viewing angle of the camera, thereby leaving the scene in the omnidirectional video. To confirm this, the processor 103 analyzes a predefined number of frames and, should the person be absent from all of them, stops tracking of that person or object of interest. The predefined number of frames from which an object is to be absent to stop tracking may correspond, for example, to a suitable amount of seconds in the displayed video.

In an embodiment, the displayed portion of the image frames after the tracking of an object of interest has stopped, and no new object of interest has been selected instead, remains in the position where the previously tracked object of interest has become absent from the image frames, or the object left the scene.

According to an embodiment, the computer program code and the at least one memory 104 are configured, with the at least one processor 103, to cause the device 100 to receive further user input from the user input element 102. The further user input comprises selection of a new object of interest in the displayed portion of at least one image frame of the played omnidirectional video. The processor 103 is then configured to stop tracking the currently selected object of interest; and track the selected new object of interest in consequent image frames of the played omnidirectional video. As before the processor 103 is also adapted to adjust the displayed portion of the consequent image frames of the played omnidirectional video so that the selected new object of interest remains in the displayed portion.

In an embodiment, the further user input received from the user input element may comprise a deselection command, or a command to cancel the selection of the currently selected object of interest. This can be used when a wrong object of interest has been detected by the processor or erroneously selected by the user.

In an embodiment, the further user input received by the processor 103 from the user input element 102 comprises navigation of the displayed portion of the image frames of the played omnidirectional video. The navigation of the displayed portion can include user-induced movement of the image frame, manual adjustments such as width and height of the displayed "viewpoint" portion of the omnidirectional video. The processor 103 is then configured to, together with the at least one memory 104, take into account the received further user input and adjust the displayed portion of the image frames of the played omnidirectional video accordingly. For example, the user may wish to "look around" in the omnidirectional video that is playing, however the controller 103 may be configured to restrict movement of the displayed portion such that the user is not allowed to move it completely away from the tracked object of interest. As a non-limiting alternative, the user may be allowed to temporarily freely go beyond the borders of the displayed viewpoint, but then the displayed portion is "pulled back" to the currently tracked object of interest once the navigation stops. In an embodiment, the input element 102 comprises a touch sensor, and the navigation of the displayed portion can comprise putting a finger down on the touch screen and moving the finger along the screen, or dragging the finger, to move the displayed portion of the image frames. The "pull back" to the currently tracked object can occur when the user releases the finger, or moves the finger away from the screen, thereby stopping the navigation. Any suitable external object can be used instead of a finger, for example a stylus.

Figure 1B:
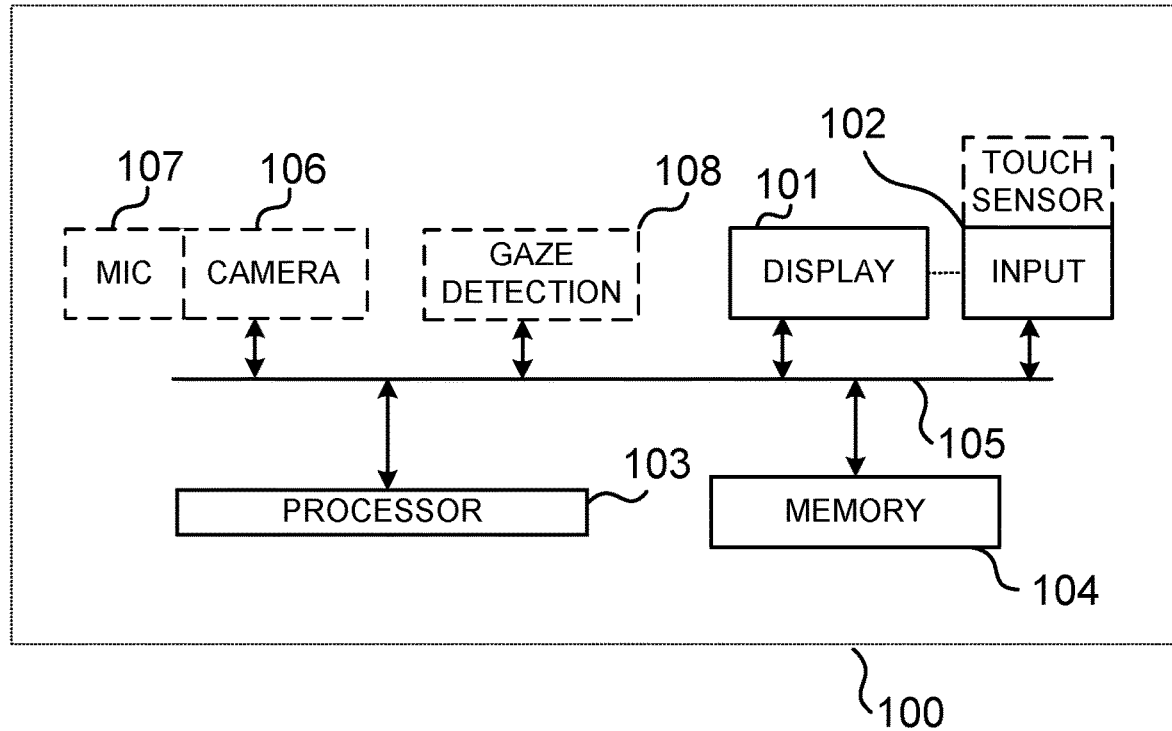
FIG. 1b is a schematic illustration of a device according to an embodiment.

In an embodiment, various components of the device 100, such as the processor 103, the memory 104 and the input element 102 may communicate with each other via a centralized circuit system 105. Other elements and components of the device 100 may also be connected through this system 105, as shown in FIG. 1b. The centralized circuit system 105 may be various devices configured to, among other things, provide or enable communication between the components of the device 100. In certain embodiments, the centralized circuit system 105 may be a central printed circuit board (PCB) such as a motherboard, a main board, a system board, or a logic board. The centralized circuit system 105 may also, or alternatively, include other printed circuit assemblies (PCAs) or communication channel media.

In an embodiment, the processor 103 is configured to record metadata and to store it in the memory 104. The metadata can include, for example, the selected portion of the image displayed at a certain moment. This can have e.g. an effect of simplified video editing of omnidirectional videos. In embodiments, the metadata may also include additional information from any optional elements the device 100 comprises, such as for example accelerometer data, gyroscope data, magnetometer data and the like.

In an embodiment, the processor 103 is configured to compute a distance from the tracked object of interest to a camera used for capturing the omnidirectional video. The computation may be based on an algorithm stored in the memory for computing distance in between objects and the camera in a pre-recorded video. Alternatively, the processor 103 can be configured to calculate the said distance based on metadata provided by the camera 106. This can have an effect of more accurate segmentation of a video in post-production.

FIG. 1b shows an example embodiment of the device 100 with a camera 106 having an image-capture field of view of at least 180 degrees in at least one of a horizontal direction and a vertical direction. In FIG. 1b, dashed lines refer to optional elements that may be removed and/or replaced with other elements. In this embodiment, the processor 103 receives the 360 footage captured by the camera 106, performs the abovementioned operations with the received 360 video and records metadata into the memory 104, wherein the metadata includes an indication of the displayed portion of the image frames of the played omnidirectional video, and time data corresponding to the captured omnidirectional video, allowing for a time-mapped video with a selection of viewpoints and/or objects of interest to be stored in the memory 104. With this embodiment, an interface can be provided to a user allowing to select an object of interest and track this object as the video is being recorded live. Embodiments are not limited to real-time video recording and editing devices, or post-processing devices, but rather can be used in both of these implementations.

The camera 106 according to the embodiment may be associated with an image-capture field of view of at least degrees in at least one of a horizontal direction and a vertical direction. For example, the camera 106 may be a '360 camera' associated with a 360×360 spherical image-capture field of view. Alternatively, the camera 106 may be associated with an image-capture field of view of 180 degrees or less than 180 degrees, in which case, the device 100 may comprise more than one camera 106 in operative communication with one another, such that a combined image-capture field of view of the one or more cameras is at least 180 degrees. The camera 106 may include hardware and/or software necessary for capturing a series of image frames to generate a video stream. For example, the camera 106 may include hardware, such as a lens and/or other optical component(s) such as one or more image sensors. Examples of an image sensor may include, but are not limited to, a complementary metal-oxide semiconductor (CMOS) image sensor, a charge-coupled device (CCD) image sensor, a backside illumination sensor (BSI) and the like. Alternatively, the camera 106 may include only the hardware for capturing video, while a memory device of the device 100 stores instructions for execution by the processor 103 in the form of software for generating a video stream from the captured video. In an example embodiment, the camera 108 may further include a processing element such as a coprocessor that assists the processor 103 in processing image frame data and an encoder and/or decoder for compressing and/or decompressing image frame data. The encoder and/or decoder may encode and/or decode according to a standard format, for example, a Joint Photographic Experts Group (JPEG) standard format. The camera 106 may also be an ultra-wide angle camera.

The device 100 can also comprise a distance measurement element (not shown in the Figures) which is configured to measure a distance between the camera 106 and the selected object of interest. The distance measurement can then also be recorded by the processor 103 into the metadata stored in the memory 104.

In an embodiment, the camera 106 may be coupled with one or more directional audio recording elements 107, for example directional microphones, with each of the elements 107 configured to capture and record sound (i.e. audio) emanating from at least one direction into the memory 104. In an embodiment, the controller 103 also focuses the directional audio recording element 107 in the direction of the tracked object of interest. In an embodiment, when a new object of interest is selected by the user and tracked by the device 100, the directional audio recording element 107 is configured to also change the direction of audio recording so that it captures sound from a direction of the new object of interest. This can have an effect of focused audio recording on the object of interest, filtering possible noises of the surroundings.

In an embodiment, the device 100 also comprises a gaze detection element 108 which is configured to monitor the gaze direction of a camera user. The computer program code and the at least one memory 104 are configured, with the at least one processor 103, to cause the device 100 to identify an object of interest in at least one image frame of the played omnidirectional video based on the detected gaze direction of the camera user. The gaze identification can be useful in the segmentation of image frames. The gaze detection element 108 may also be a part of the user interface The above embodiments have a technical effect of providing a comfortable viewing experience for omnidirectional videos with identifiable objects of interest. The embodiments wherein metadata comprising user-selected objects of interest is recorded also have a technical effect of accessible video editing "on the fly" of a played back omnidirectional video.

Figure 2:
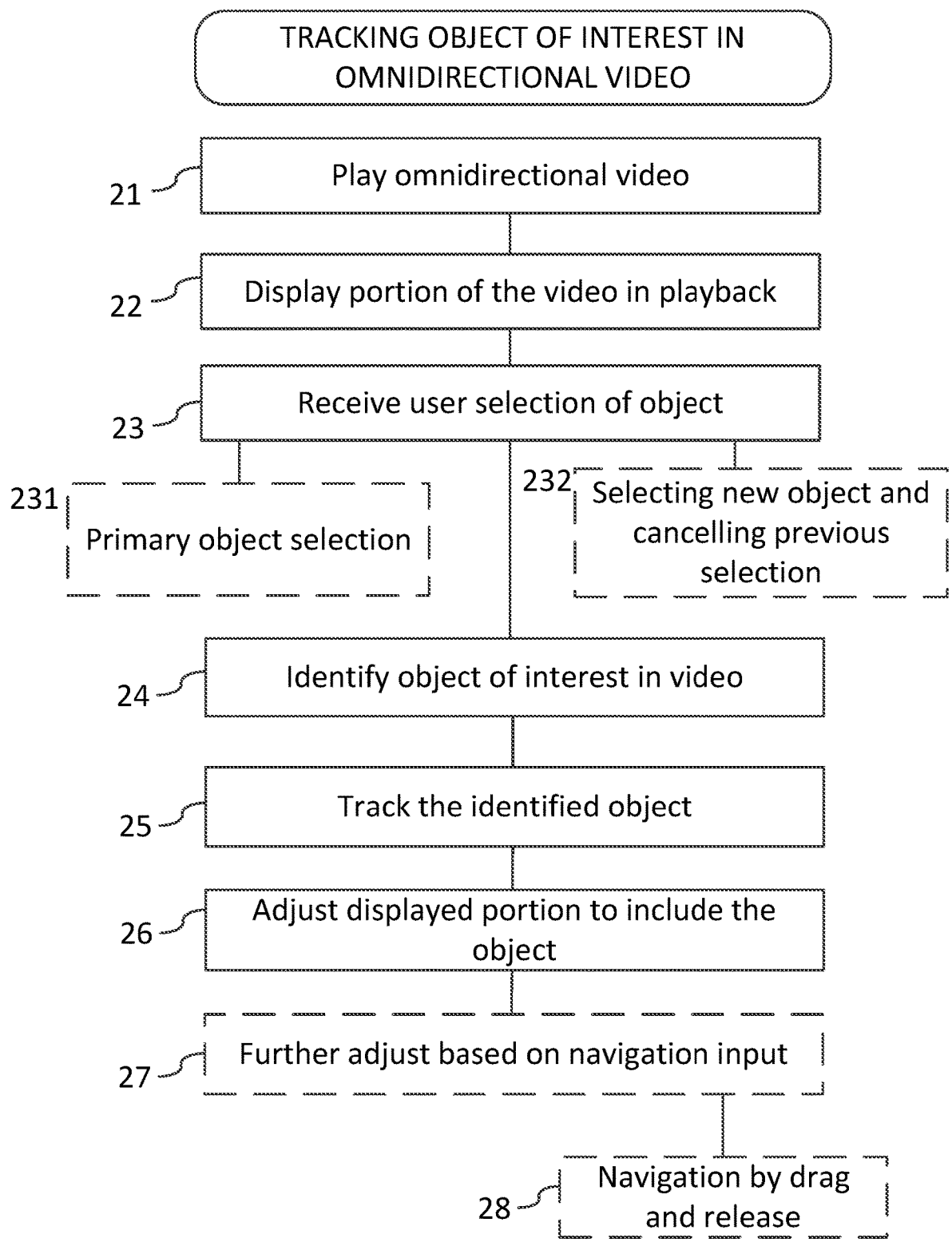
FIG. 2 is a block diagram of a method according to an embodiment.

FIG. 2 is a flow chart for a method according to an embodiment. The method may be, for example, a method for tracking an object of interest in an omnidirectional video. The method comprises playing 21 an omnidirectional video comprising a series of image frames, and displaying 22 a portion of image frames of the played omnidirectional video on a display element. The image frame portions displayed by default may be chosen based on camera positioning or based on any other predefined factor, or randomly.

The method further includes receiving 23 a user input comprising selection of an object of interest in the displayed portion of at least one image frame of the played omnidirectional video.

The object of interest is identified at 24 in at least one image frame of the played omnidirectional video based on the user input, and then tracking 25 of the selected object of interest in consequent image frames of the played omnidirectional video begins. These actions may be carried out using any suitable video segmentation technique. The displayed portion of the consequent image frames of the played omnidirectional video is then adjusted 26 so that the tracked object of interest remains in the displayed portion. In an embodiment, this includes centering the viewpoint (the displayed portion) on the tracked object of interest; in an alternative embodiment the displayed portion follows the tracked object in a more subtle manner, so that the viewpoint only moves when the tracked object reaches one of its borders.

In an embodiment, the method comprises detecting that the tracked object of interest is absent from a predetermined number of image frames, for example from a number of image frames which corresponds to any number between 2 and 10 seconds of the played video. The object of interest may be absent due to its own movement for example behind an obstacle, or movement of the camera causing the object to be out of sight. The tracking is then stopped and not resumed until a new selection is received from a user, or, in an embodiment, until the object reappears in a predetermined number of consequent image frames.

The user input at 23 may be a primary selection 231, i.e. selection of an object of interest when no other object of interest is already selected and tracked. Alternatively, the user input can be a further input 232 wherein a new object of interest is selected while the previously selected object of interest is still being tracked. In this case, tracking of the previously selected object of interest is stopped, and a new object of interest is selected as in 23, with all subsequent actions 24, 25, 26 repeated for the newly selected object.

The method can comprise an optional step of receiving 27 further user input comprising navigation of the displayed portion of the image frames of the played omnidirectional video, and adjusting the displayed portion of the image frames accordingly. The method according to the embodiment grants some control over the viewpoint positioning to the user, while at the same time continuing to track the object of interest and maintaining the default viewpoint position so that said object remains in it.

According to an embodiment, the navigation can comprise moving (dragging) 28 a finger or any other suitable external object, such as a stylus, along a touch screen to move the displayed portion of the image frames in a predetermined direction; and moving the finger away (releasing) to allow the navigation to stop. When the navigation stops, the displayed portion of the image can move back to the position wherein the object of interest remains in it.

The omnidirectional video that is being played 21 according to the method may be stored in the memory, according to an embodiment. As mentioned, the memory is not limited to localized hardware and may be for example a cloud storage.

The methods above can be useful for example when viewing and/or editing videos taken by an omnidirectional camera, wherein the footage comprises one or more objects of interest.

Figure 3A:
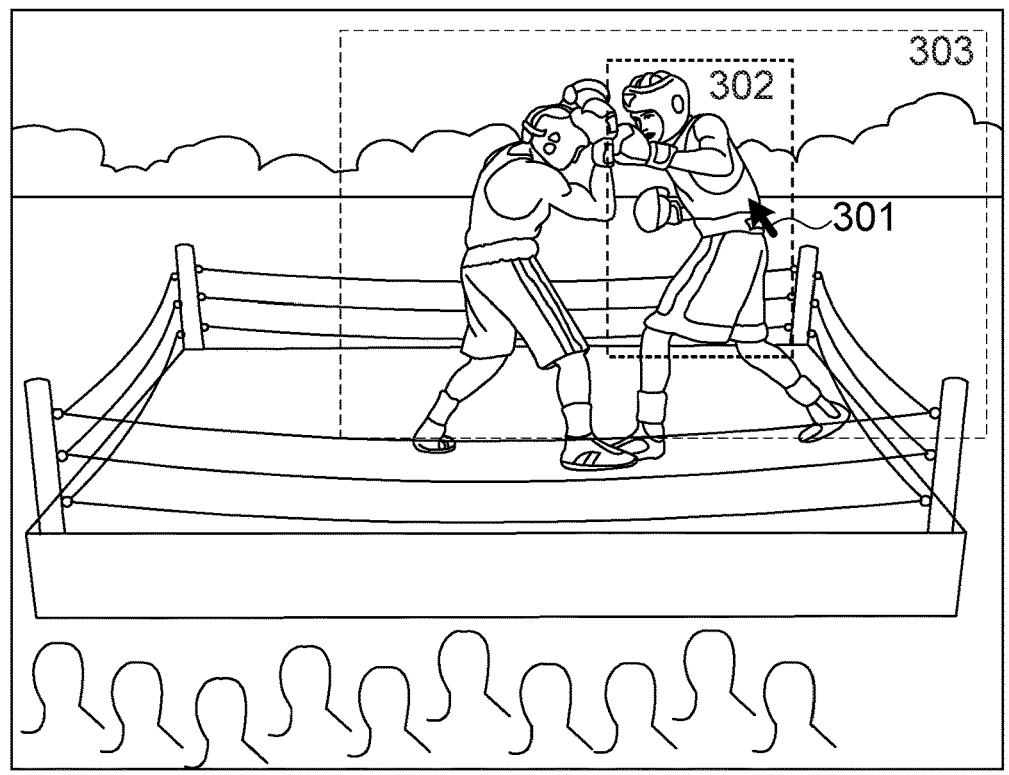
FIG. 3a is a graphic illustration of an embodiment.
Figure 3B:
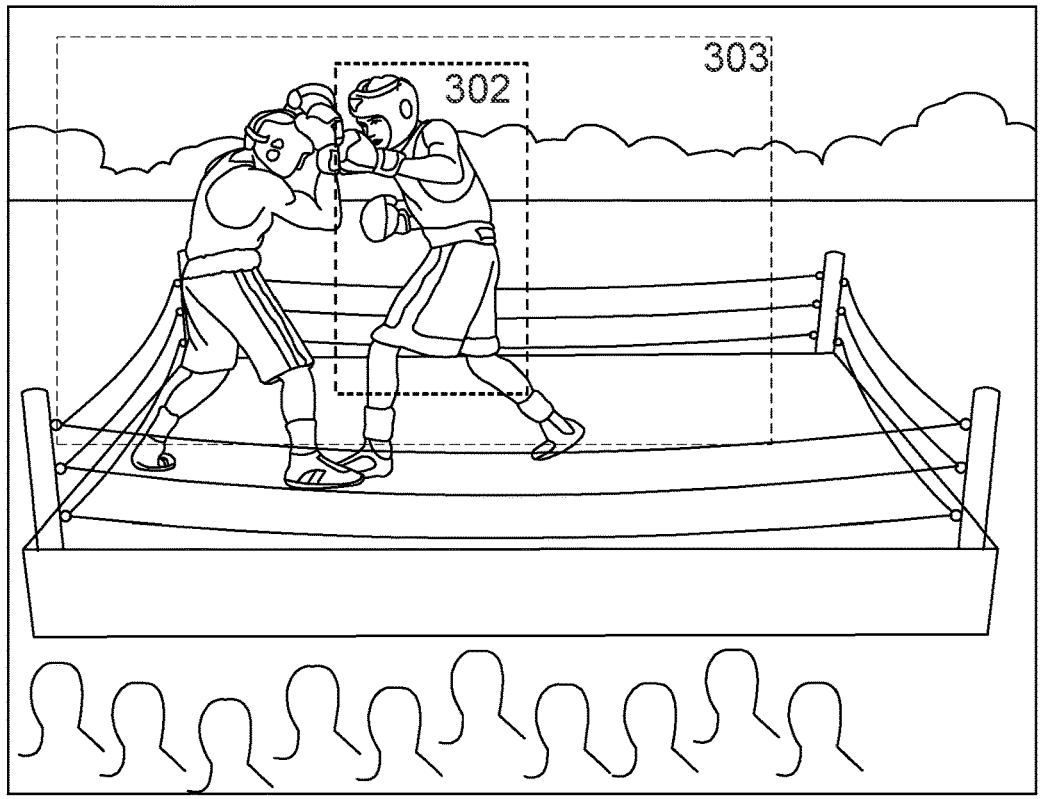
FIG. 3b is a graphic illustration of the embodiment shown in FIG. 3a with movement of the object of interest.

FIGS. 3a and 3b are a simple illustration of an embodiment. As it is clear to a skilled person, this embodiment is presented for exemplary purposes only and is not to be interpreted as limiting. In this case, an omnidirectional video camera has filmed (or is filming) an abstract outdoor boxing match with its surroundings, as can be seen in an image frame portion 300. The figure includes a selection 301 of an object of interest by a user, illustrated by the mouse pointer 301, but naturally not limited to selection by a mouse click. The selected object of interest, in this case the fighter on the right side, is then identified and tracked, schematically shown by a frame 302. The identification and tracking may be based on various segmentation techniques, and can also include face recognition, contrast against background recognition, color recognition etc. As the boxers move around the ring, the boxer is tracked and the frame 302 moves. If the selected boxer were to move off the ring, or a playback user selected another object of interest for tracking (for example the second boxer), tracking 302 of the current object would have stopped and either cancelled or switched. The additional frame 303 shows possible adjustment of the displayed portion if this portion has a smaller field of view, and follows the object of interest more closely.

Figure 4A:
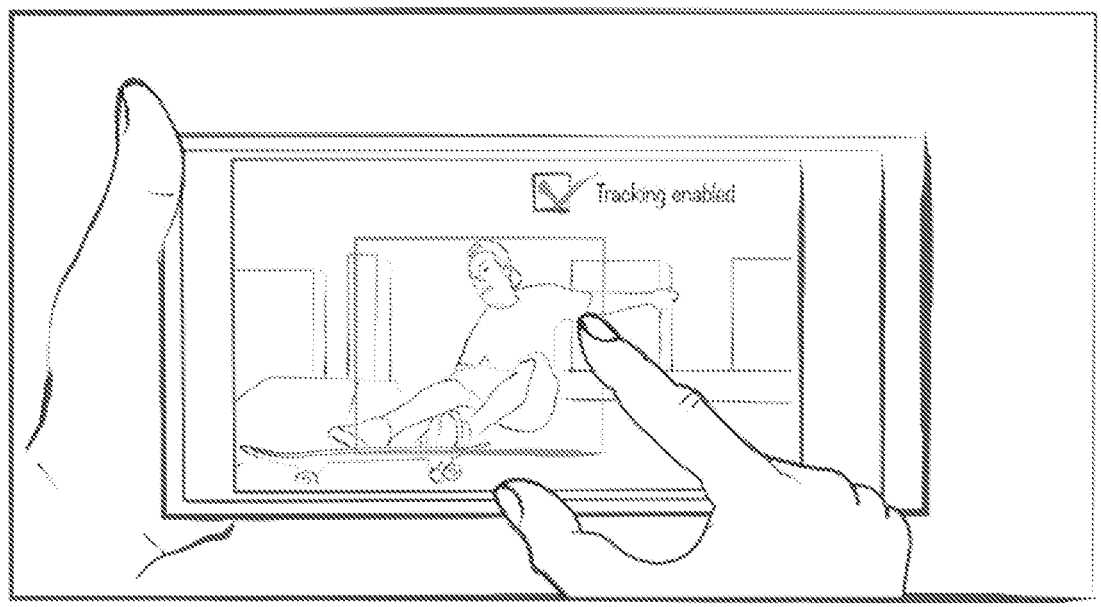
FIG. 4a is a graphic illustration of an embodiment implemented in a handheld touch screen device.
Figure 4B:
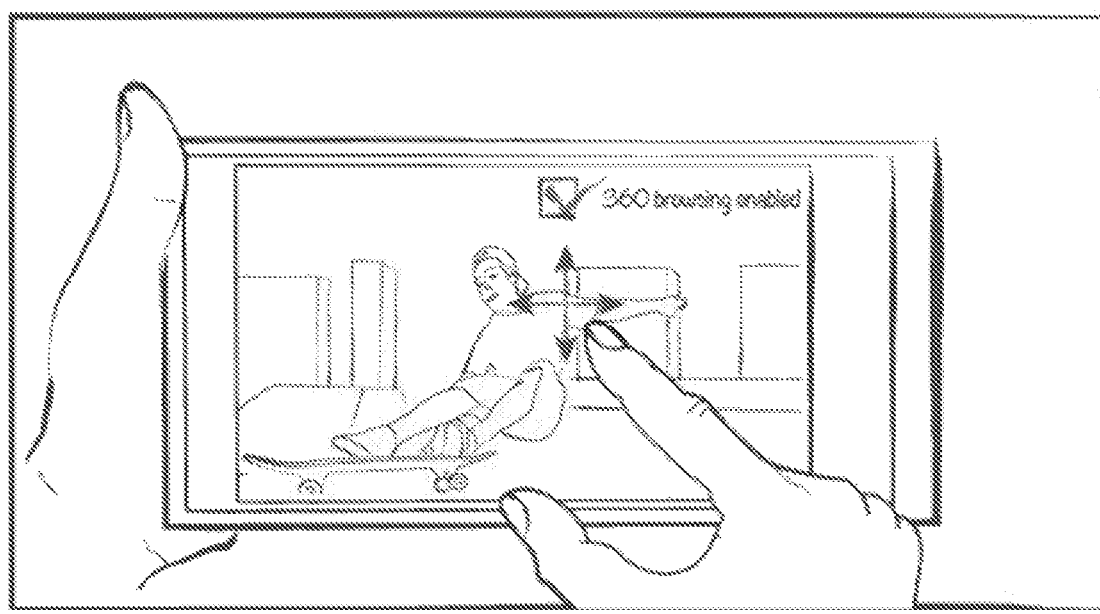
FIG. 4b is a graphic illustration of the embodiment shown in FIG. 4a with navigation.

FIGS. 4a and 4b are simple illustrations of an embodiment demonstrating the selection of an object of interest and navigation of the viewpoint on a touch screen. FIG. 4a shows an exemplary implementation wherein the above embodiments are used in a handheld device with a touch screen, and the selection is made by tapping the object of interest as it appears on the screen. The tapping input required for the selection may be different from a normal tap on the touch screen, for example over a longer period of time, or via force touch. Once an object of interest is identified, the processor may be configured to show a visual confirmation such as a sign on a vacant part of the screen "tracking enabled". The user input in any of the above embodiments may be done during video playback or while the video is paused. FIG. 4b shows activation of a mode of navigation of the viewpoint (displayed portion of the image frame), which can be visualized for example by placing a sign "360 browsing enabled" on a vacant part of the screen. In this embodiment, the navigation is performed by dragging a finger along the touch screen, moving the viewpoint in a corresponding direction, and then releasing the finger to pull back the viewpoint to the object of interest.

The methods according to the embodiments above may be performed, for example, by a processor.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Figure 5:
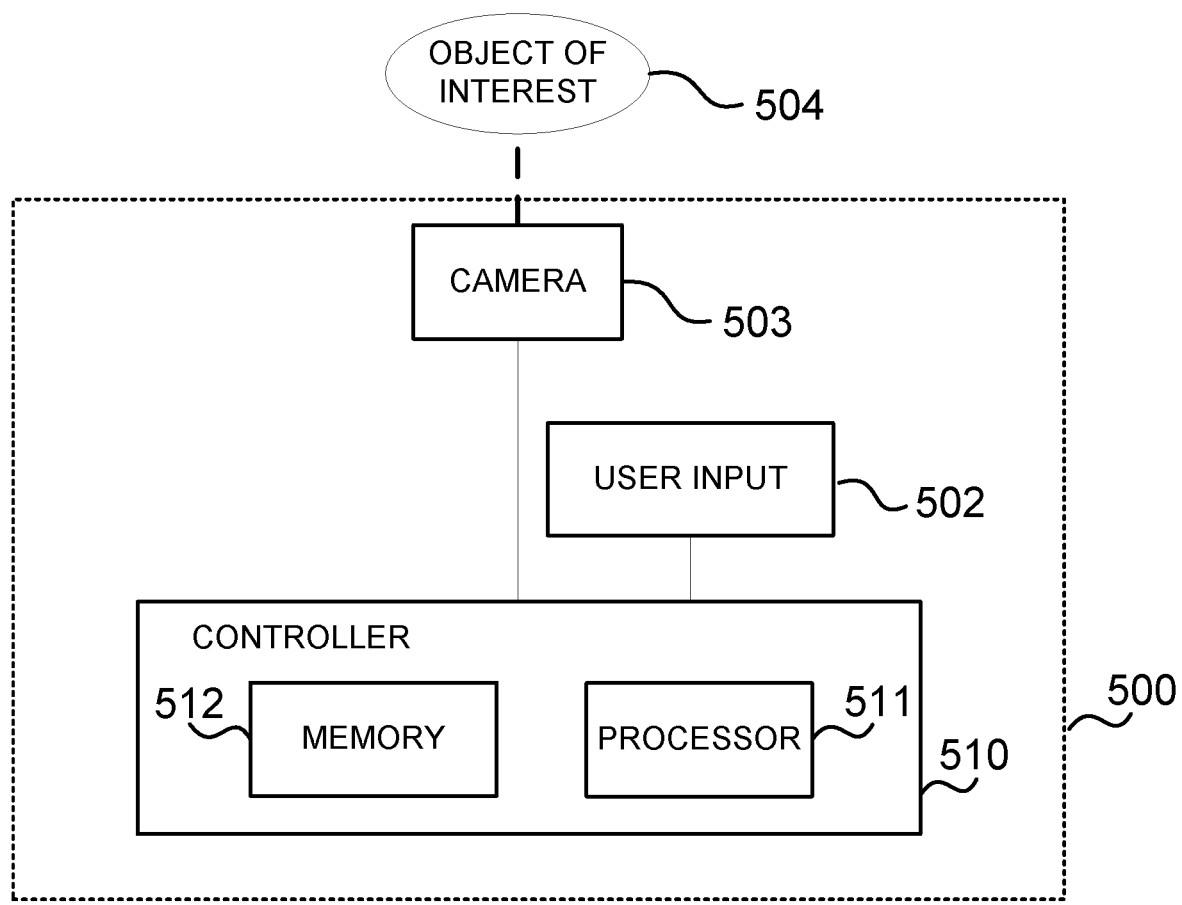
FIG. 5 is a schematic illustration of a device with a camera according to an embodiment.

FIG. 5 shows a block diagram of a device 500 according to an embodiment. The device 500 comprises: a controller element 510 comprising at least one processor 511 and at least one memory element 512 including computer program code, a user input element 502 coupled to the controller 510, a camera 503 coupled to the controller 510 and configured to capture an omnidirectional video comprising a series of image frames, the camera 503 having an image-capture field of view of at least 180 degrees in at least one of a horizontal direction and a vertical direction. In embodiments, the elements coupled to the controller may be coupled directly to the processor 511. The computer program code and the at least one memory 512 are configured, with the at least one processor 511, to cause the device 500 to receive the omnidirectional video captured by the camera 503, receive a user input from the user input element 502, the user input comprising selection of an object of interest 504 in at least one image frame of the received omnidirectional video. The user input element 502 can comprise a gesture recognition element, a gaze detection element, a voice command element, directional audio recording element or a combination thereof.

The processor 511 is further configured to identify the object of interest 504 in at least one image frame of the received omnidirectional video based on the user input, track the selected object of interest 504 in consequent image frames of the omnidirectional video, and assign a portion of the consequent image frames of the received omnidirectional video so that the tracked object of interest 504 remains in the assigned portion. Then, metadata is recorded in the memory 512, wherein the metadata comprises an indication of the assigned portion of the image frames of the received omnidirectional video. The metadata may also comprise a timeline that links any other metadata to the received omnidirectional video. The assigned portion of the image frames can be a digital viewpoint that is adapted to be displayed on a display when the recorded video is played back. The assigned portion of the image frames can be adapted to have a field of view and aspect ratio compatible with a variety of conventional displays devices.

The device may be used as a system for real-time video editing, or for recording of meaningful metadata while capturing an omnidirectional video.

According to an aspect, a device is provided. The device comprises: at least one processor and at least one memory including computer program code, a display element coupled to the processor, and a user input element coupled to the processor. The computer program code and the at least one memory are configured, with the at least one processor, to cause the device to: play an omnidirectional video comprising a series of image frames, display a portion of the image frames of the played omnidirectional video on the display element, receive a user input from the user input element, the user input comprising selection of an object of interest in the displayed portion of at least one image frame of the played omnidirectional video, identify the object of interest in at least one image frame of the played omnidirectional video based on the user input, track the selected object of interest in consequent image frames of the played omnidirectional video, and adjust the displayed portion of the consequent image frames of the played omnidirectional video so that the tracked object of interest remains in the displayed portion.

In an embodiment, the computer program code and the at least one memory are configured, with the at least one processor, to cause the device to adjust the displayed portion of the consequent image frames of the played omnidirectional video by centering the displayed portion of the consequent image frames of the played omnidirectional video on the tracked object of interest.

In an embodiment, alternatively or in addition to the above embodiments, the computer program code and the at least one memory are configured, with the at least one processor, to cause the device to detect that the tracked object of interest is absent from a predefined number of image frames, and stop tracking the selected object of interest.

In an embodiment, alternatively or in addition to the above embodiments, the computer program code and the at least one memory are configured, with the at least one processor, to cause the device to: receive further user input from the user input element, the further user input comprising selection of a new object of interest in the displayed portion of at least one image frame of the played omnidirectional video; stop tracking the previously selected object of interest; track the selected new object of interest in consequent image frames of the played omnidirectional video; and adjust the displayed portion of the consequent image frames of the played omnidirectional video so that the selected new object of interest remains in the displayed portion.

In an embodiment, alternatively or in addition to the above embodiments, the computer program code and the at least one memory are configured, with the at least one processor, to cause the device to: receive further user input from the user input element, the user input comprising navigation of the displayed portion of the image frames of the played omnidirectional video, and adjust the displayed portion of the image frames of the played omnidirectional video based on the received navigation.

In an embodiment, in addition to the above embodiment, the user input element comprises a touch sensor, and the computer program code and the at least one memory are configured, with the at least one processor, to cause the device to: move the displayed portion of the image frames of the played omnidirectional video based on a user input comprising navigation of the displayed portion of the image frames by moving a finger along the touch sensor to move the displayed portion of the image frames of the played omnidirectional video, and return displayed portion of the image frames of the played omnidirectional video to a position wherein the tracked object of interest is in the displayed portion based on a user input comprising removing the finger from the touch sensor to stop the navigation of the displayed portion of the image frames.

In an embodiment, alternatively or in addition to the above embodiments, the device comprises a camera configured to capture an omnidirectional video comprising a series of image frames, the camera having an image-capture field of view of at least 180 degrees in at least one of a horizontal direction and a vertical direction, wherein the computer program code and the at least one memory are configured, with the at least one processor, to cause the device to receive the omnidirectional video captured by the camera, perform the said operations on the received omnidirectional video; and record metadata in the memory, the metadata comprising an indication of the displayed portion of the image frames of the played omnidirectional video, and time data corresponding to the captured omnidirectional video.

In an embodiment, in addition to the above embodiment, the device comprises a distance measurement element coupled to the processor and configured to measure the distance between the camera and the selected object of interest, wherein the metadata further comprises the distance measurement.

In an embodiment, alternatively or in addition to the above embodiment, the device comprises a directional audio recording element, wherein the computer program code and the at least one memory are configured, with the at least one processor, to cause the device to record an audio stream along with the captured video, and focus the directional audio recording element in the direction of the tracked object of interest.

In an embodiment, alternatively or in addition to the above embodiment, the device comprises a gaze detection element configured to detect a gaze direction of a camera user, wherein the computer program code and the at least one memory are configured, with the at least one processor, to cause the device to identify an object of interest in at least one image frame of the played omnidirectional video based on the detected gaze direction of the camera user.

In an embodiment, alternatively or in addition to the above embodiments, the omnidirectional video is prerecorded.

In an embodiment, alternatively or in addition to the above embodiments, the user input element comprises a keyboard and mouse.

According to an aspect, a method is provided. The method comprises: playing an omnidirectional video comprising a series of image frames, displaying a portion of image frames of the played omnidirectional video on a display element, receiving a user input comprising selection of an object of interest in the displayed portion of at least one image frame of the played omnidirectional video, identifying the object of interest in at least one image frame of the played omnidirectional video based on the user input, tracking the selected object of interest in consequent image frames of the played omnidirectional video, and adjusting the displayed portion of the consequent image frames of the played omnidirectional video so that the tracked object of interest remains in the displayed portion.

In an embodiment, adjusting the displayed portion of the consequent image frames of the played omnidirectional video comprises centering the displayed portion of the consequent image frames of the played omnidirectional video on the tracked object of interest.

In an embodiment, alternatively or in addition to the above embodiments, the method comprises detecting that the tracked object of interest is absent from a predefined number of image frames, and stopping tracking the selected object of interest.

In an embodiment, alternatively or in addition to the above embodiments, the method comprises receiving further user input from the user input element, the further user input comprising selection of a new object of interest in the displayed portion of at least one image frame of the played omnidirectional video; stopping tracking the previously selected object of interest; tracking the selected new object of interest in consequent image frames of the played omnidirectional video; and adjusting the displayed portion of the consequent image frames of the played omnidirectional video so that the selected new object of interest remains in the displayed portion.

In an embodiment, alternatively or in addition to the above embodiments, the method comprises receiving further user input from the user input element, the further user input comprising navigation of the displayed portion of the image frames of the played omnidirectional video, and adjusting the displayed portion of the image frames of the played omnidirectional video based on the received navigation.

In an embodiment, alternatively or in addition to the above embodiments, the method comprises storing an omnidirectional video comprising a series of image frames in a memory, and playing the stored omnidirectional video.

In an embodiment, alternatively or in addition to the above embodiments, the method comprises computing a distance from the tracked object of interest to a camera used for capturing the omnidirectional video.

According to an aspect, a device is provided. The device comprises at least one processor and at least one memory including computer program code, a user input element coupled to the processor, a camera coupled to the processor and configured to capture an omnidirectional video comprising a series of image frames, the camera having an image-capture field of view of at least 180 degrees in at least one of a horizontal direction and a vertical direction. The computer program code and the at least one memory are configured, with the at least one processor, to cause the device to receive the omnidirectional video captured by the camera, receive a user input from the user input unit, the user input comprising selection of an object of interest in at least one image frame of the received omnidirectional video, identify the object of interest in at least one image frame of the received omnidirectional video based on the user input, track the selected object of interest in consequent image frames of the received omnidirectional video, assign a portion of the consequent image frames of the received omnidirectional video so that the tracked object of interest remains in the assigned portion of the image frames, and record metadata in the memory, the metadata comprising an indication of the assigned portion of the image frames of the received omnidirectional video.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the technical effects described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or device may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising:
   at least one processor and at least one memory including computer program code,
   a display element coupled to the processor, and
   a user input element coupled to the processor;
   wherein the computer program code and the at least one memory are configured, with the at least one processor, to cause the device to:
   play an omnidirectional video comprising a series of image frames,
   display a portion of the image frames of the played omnidirectional video on the display element,
   receive a user input from the user input element, the user input comprising selection of an object of interest in the displayed portion of at least one image frame of the played omnidirectional video,
   identify the object of interest in at least one image frame of the played omnidirectional video based on the user input,
   track the selected object of interest in consequent image frames of the played omnidirectional video as the selected object of interest appears in the consequent image frames of the played omnidirectional video, the selected object of interest being absent in some of the consequent image frames, and after the selected object of interest is absent from the consequent image frames of the played omnidirectional video, tracking of the selected object of interest is resumed as the selected object of interest reappears in the consequent image frames, and
   adjust the displayed portion of the consequent image frames of the played omnidirectional video so that the tracked object of interest remains in the displayed portion.

2. A device as claimed in claim 1, wherein the computer program code and the at least one memory are configured, with the at least one processor, to cause the device to adjust the displayed portion of the consequent image frames of the played omnidirectional video by centering the displayed portion of the consequent image frames of the played omnidirectional video on the tracked object of interest.

3. A device as claimed in claim 1, wherein the computer program code and the at least one memory are configured, with the at least one processor, to cause the device to detect that the tracked object of interest is absent from a predefined number of image frames, and stop tracking the selected object of interest, wherein the tracked object of interest is absent as a result of movement of a camera capturing the omnidirectional video causing the object of interest to be out of the field of view of the camera or movement of the tracked object of interest behind an obstacle.

4. A device as claimed in claim 1, wherein the computer program code and the at least one memory are configured, with the at least one processor, to cause the device to:
   receive further user input from the user input element, the further user input comprising selection of a new object of interest in the displayed portion of at least one image frame of the played omnidirectional video;
   stop tracking the previously selected object of interest;
   track the selected new object of interest in consequent image frames of the played omnidirectional video, and
   adjust the displayed portion of the consequent image frames of the played omnidirectional video so that the selected new object of interest remains in the displayed portion.

5. A device as claimed in claim 1, wherein the computer program code and the at least one memory are configured, with the at least one processor, to cause the device to:
   receive further user input from the user input element, the user input comprising navigation of the displayed portion of the image frames of the played omnidirectional video, and
   adjust the displayed portion of the image frames of the played omnidirectional video based on the received navigation.

6. A device as claimed in claim 5, wherein the user input element comprises a touch sensor, and the computer program code and the at least one memory are configured, with the at least one processor, to cause the device to:
   move the displayed portion of the image frames of the played omnidirectional video based on a user input comprising navigation of the displayed portion of the image frames by moving a finger along the touch sensor to move the displayed portion of the image frames of the played omnidirectional video, and
   return displayed portion of the image frames of the played omnidirectional video to a position wherein the tracked object of interest is in the displayed portion based on a user input comprising removing the finger from the touch sensor to stop the navigation of the displayed portion of the image frames.

7. A device as claimed in claim 1, comprising a camera configured to capture an omnidirectional video comprising a series of image frames, the camera having an image-capture field of view of at least 180 degrees in at least one of a horizontal direction and a vertical direction,
   wherein the computer program code and the at least one memory are configured, with the at least one processor, to cause the device to
   receive the omnidirectional video captured by the camera,
   perform the said operations on the received omnidirectional video; and
   record metadata in the memory, the metadata comprising an indication of the displayed portion of the image frames of the played omnidirectional video, and time data corresponding to the captured omnidirectional video.

8. A device as claimed in claim 7, comprising a distance measurement element coupled to the processor and configured to measure the distance between the camera and the selected object of interest, wherein the metadata further comprises the distance measurement.

9. A device as claimed in claim 7, comprising a directional audio recording element, wherein the computer program code and the at least one memory are configured, with the at least one processor, to cause the device to
  record an audio stream along with the captured video, and
  focus the directional audio recording element in the direction of the tracked object of interest.

10. A device as claimed in claim 7, comprising a gaze detection element configured to detect a gaze direction of a camera user, wherein the computer program code and the at least one memory are configured, with the at least one processor, to cause the device to identify an object of interest in at least one image frame of the played omnidirectional video based on the detected gaze direction of the camera user.

11. A device as claimed in claim 1, wherein the omnidirectional video is prerecorded.

12. A device as claimed in claim 1, wherein the user input element comprises a keyboard and mouse.

13. A method comprising:
  playing an omnidirectional video comprising a series of image frames,
  displaying a portion of image frames of the played omnidirectional video on a display element,
  receiving a user input comprising selection of an object of interest in the displayed portion of at least one image frame of the played omnidirectional video,
  identifying the object of interest in at least one image frame of the played omnidirectional video based on the user input,
  tracking the selected object of interest in consequent image frames of the played omnidirectional video as the selected object of interest appears in the consequent image frames of the played omnidirectional video, the selected object of interest being absent in some of the consequent image frames, and after the selected object of interest is absent from the consequent image frames of the played omnidirectional video, tracking the selected object of interest is resumed as the selected object of interest reappears in the consequent image frames, and
  adjusting the displayed portion of the consequent image frames of the played omnidirectional video so that the tracked object of interest remains in the displayed portion.

14. A method as claimed in claim 13, wherein adjusting the displayed portion of the consequent image frames of the played omnidirectional video comprises centering the displayed portion of the consequent image frames of the played omnidirectional video on the tracked object of interest.

15. A method as claimed in claim 13, comprising
  detecting that the tracked object of interest is absent from a predefined number of image frames, and
  stopping tracking the selected object of interest.

16. A method according to claim 13, comprising:
  receiving further user input from the user input element, the further user input comprising selection of a new object of interest in the displayed portion of at least one image frame of the played omnidirectional video;
  stopping tracking the previously selected object of interest;
  tracking the selected new object of interest in consequent image frames of the played omnidirectional video, and
  adjusting the displayed portion of the consequent image frames of the played omnidirectional video so that the selected new object of interest remains in the displayed portion.

17. A method as claimed in claim 13, comprising:
  receiving further user input from the user input element, the further user input comprising navigation of the displayed portion of the image frames of the played omnidirectional video, and
  adjusting the displayed portion of the image frames of the played omnidirectional video based on the received navigation.

18. A method as claimed in claim 13, comprising storing an omnidirectional video comprising a series of image frames in a memory, and playing the stored omnidirectional video.

19. A method as claimed in claim 13, comprising computing a distance from the tracked object of interest to a camera used for capturing the omnidirectional video.

20. A device comprising
  at least one processor and at least one memory including computer program code,
  a user input element coupled to the processor,
  a camera coupled to the processor and configured to capture an omnidirectional video comprising a series of image frames, the camera having an image-capture field of view of at least 180 degrees in at least one of a horizontal direction and a vertical direction; wherein
  the computer program code and the at least one memory are configured, with the at least one processor, to cause the device to
  receive the omnidirectional video captured by the camera,
  receive a user input from the user input unit, the user input comprising selection of an object of interest in at least one image frame of the received omnidirectional video,
  identify the object of interest in at least one image frame of the received omnidirectional video based on the user input,
  track the selected object of interest in consequent image frames of the received omnidirectional video as the selected object of interest appears in the consequent image frames of the played omnidirectional video, the selected object of interest being absent in some of the consequent image frames, and after the selected object of interest is absent from the consequent image frames of the played omnidirectional video, tracking of the selected object of interest is resumed as the selected object of interest reappears in the consequent image frames,
  assign a portion of the consequent image frames of the received omnidirectional video so that the tracked object of interest remains in the assigned portion of the image frames, and
  record metadata in the memory, the metadata comprising an indication of the assigned portion of the image frames of the received omnidirectional video.

* * * * *